(12) United States Patent
Li

(10) Patent No.: US 7,722,712 B2
(45) Date of Patent: May 25, 2010

(54) FORMALDEHYDE-FREE ADHESIVES AND LIGNOCELLULOSIC COMPOSITES MADE FROM THE ADHESIVES

(75) Inventor: Kaichang Li, Corvallis, OR (US)

(73) Assignee: State of Oregon Acting by and Through the State Board of Higher Education on Behalf of Oregon State University, Corvallis, OR (US)

( * ) Notice: Subject to any disclaimer, the term of this patent is extended or adjusted under 35 U.S.C. 154(b) by 780 days.

(21) Appl. No.: 10/586,623

(22) PCT Filed: Jan. 19, 2005

(86) PCT No.: PCT/US2005/001981

§ 371 (c)(1),
(2), (4) Date: Jul. 19, 2006

(87) PCT Pub. No.: WO2005/072260

PCT Pub. Date: Aug. 11, 2005

(65) Prior Publication Data

US 2008/0213597 A1 Sep. 4, 2008

Related U.S. Application Data

(60) Provisional application No. 60/538,932, filed on Jan. 22, 2004.

(51) Int. Cl.
*C09J 197/00* (2006.01)
*C09J 189/00* (2006.01)

(52) U.S. Cl. ............... 106/126.2; 106/127.1; 106/128.1; 106/131.1; 106/137.1; 106/137.3; 106/137.4; 106/137.6; 106/150.1; 106/152.1; 524/25; 524/75; 428/514

(58) Field of Classification Search ............... 106/127.1, 106/128.1, 131.1, 150.1, 152.1, 155.1, 126.2, 106/137.1, 137.3, 137.4, 137.6; 524/25, 524/75; 428/514
See application file for complete search history.

(56) References Cited

U.S. PATENT DOCUMENTS

| | | | |
|---|---|---|---|
| 2,882,250 A | 4/1959 | Baker | |
| 2,926,116 A | 2/1960 | Keim | |
| 2,926,154 A | 2/1960 | Keim | |
| 3,207,613 A | 9/1965 | Merrill | |
| 3,274,042 A * | 9/1966 | Gilboe et al. | ............... 156/328 |
| 3,285,801 A | 11/1966 | Sarjeant | |
| 3,395,033 A | 7/1968 | Remer | |
| 3,494,775 A * | 2/1970 | Coscia et al. | ............ 106/155.1 |
| 3,634,399 A | 1/1972 | Coscia et al. | |
| 3,697,495 A | 10/1972 | Falkehag | |
| 4,201,851 A | 5/1980 | Chen | |
| 4,382,136 A | 5/1983 | Blount | |
| 4,421,824 A | 12/1983 | Gupta et al. | |
| 4,675,351 A | 6/1987 | Brown | |
| 5,017,675 A | 5/1991 | Marten et al. | |
| 5,374,670 A * | 12/1994 | Ayorinde et al. | ............... 524/13 |
| 5,708,059 A | 1/1998 | Pfeil et al. | |
| 6,030,562 A | 2/2000 | Lehtinen et al. | |
| 6,124,032 A | 9/2000 | Bloch et al. | |
| 6,217,976 B1 | 4/2001 | Macpherson et al. | |
| 6,258,920 B1 | 7/2001 | Starner et al. | |
| 6,277,481 B1 | 8/2001 | Sugino et al. | |
| 6,306,997 B1 | 10/2001 | Kuo et al. | |
| 6,339,116 B1 | 1/2002 | Afzali-Ardakani et al. | |
| 6,368,529 B1 | 4/2002 | Lloyd et al. | |
| 6,395,356 B1 | 5/2002 | Wielockx et al. | |
| 6,406,530 B1 * | 6/2002 | Bengs et al. | ............... 106/137.1 |
| 6,716,421 B2 | 4/2004 | Brode, III et al. | |
| 7,060,798 B2 | 6/2006 | Li et al. | |
| 7,252,735 B2 | 8/2007 | Li | |
| 2001/0014399 A1 | 8/2001 | Jasne | |
| 2002/0005251 A1 | 1/2002 | Sun et al. | |
| 2002/0026025 A1 | 2/2002 | Kuo et al. | |
| 2004/0037906 A1 | 2/2004 | Li et al. | |
| 2004/0089418 A1 | 5/2004 | Li | |

(Continued)

FOREIGN PATENT DOCUMENTS

DE    198 43 493    3/2003

(Continued)

OTHER PUBLICATIONS

Brown, "Better Bonding with Beans," *Environmental Health Perspectives* 113(8):A538-A541, 2005.

(Continued)

*Primary Examiner*—David M Brunsman
(74) *Attorney, Agent, or Firm*—Klarquist Sparkman, LLP

(57) ABSTRACT

A first variant of an adhesive composition for making a lignocellulosic composite includes soy protein and/or lignin; at least one substantially formaldehyde-free curing agent that includes at least one amine, amide, imine, imide, or nitrogen-containing heterocyclic functional group that can react with at least one functional group of the soy protein; and at least one compound selected from a boron compound, a group IA oxide or hydroxide, or a group IIA oxide or hydroxide. A second variant of an adhesive composition includes a first component selected from soy protein and/or lignin; and at least one substantially formaldehyde-free curing agent selected from a reaction product of epichlorohydrin with ethylenediamine, a reaction product of epichlorohydrin with bis-hexamethylenetriamine, or a reaction product of epichlorohydrin with hexamethylenediamine.

39 Claims, 3 Drawing Sheets

U.S. PATENT DOCUMENTS

| | | |
|---|---|---|
| 2004/0220368 A1 | 11/2004 | Li et al. |
| 2005/0261404 A1 | 11/2005 | Rivers et al. |
| 2005/0282988 A1 | 12/2005 | Li |

FOREIGN PATENT DOCUMENTS

| | | |
|---|---|---|
| EP | 0 199 171 A2 | 7/1986 |
| EP | 0 878 133 A1 | 11/1998 |
| EP | 0 969 056 A1 | 1/2002 |
| WO | WO 00/08110 | 2/2000 |

OTHER PUBLICATIONS

Columbia Forest Products, "A Breath of Fresh Thinking PUREBOND™," http://www.columbiaforestproducts.com/products/prodpb/aspx, downloaded Aug. 20, 2006.

Columbia Forest Products, "Columbia Forest Products Launches a Revolution in Plywood Adhesives," *Environmental Building News* 14(6):9, 2005.

Evertz, "Bonding with the Industry," http://www.adhesivesmag.com/CDA/Articles/Feature_ Article/df86b2419220c010VgnVC, downloaded Jul. 28, 2006

Georgia-Pacific Resins, Inc. Product Data Sheet, "Paper Chemicals. The Entire spectrum of Performance Paper Chemicals from Georgia Pacific," 1998.

Hampel et al., Glossary of Chemical Terms (2d ed.), Van Nostrand Reinhold Company, p. 254, 1982.

Hercules Product Data Sheet, "KYMENE® 557H Wet-Strength Resin. Insolubilizing Agent for Water-Soluble Polymers and Gums," 1999.

Hercules Material Safety Data Sheet, "REZOSOL® 9223 Creping Aid," 2003.

Hawley's Condensed Chemical Dictionary (13$^{th}$ ed.), John Wiley & Sons, Inc., p. 964,1997.

Metafore, "Metafore announces recipients of inaugural Innovations Award," www.metafore.org, 2006.

RisMedia, "Top Green Building Products of 2006 Selected by Editors of Sustainable Industries Journal," http://rismedia.com/index.php.article/articleview/15478/1/1/, downloaded Aug. 21, 2006.

Office Action dated Nov. 13, 2006, from U.S. Appl. No. 10/438,147, filed May 13, 2003.

Office Action dated Dec. 22, 2006, from U.S. Appl. No. 11/372,998, filed Mar. 9, 2006.

Office action dated Sep. 15, 2005 in U.S. Appl. No. 10/802,500.

Office action dated Jul. 14, 2005 from U.S. Appl. No. 10/437,595.

Office action dated Aug. 4, 2005 from U.S. Appl. No. 10/438,147.

Office action dated Mar. 30, 2006 from U.S. Appl. No. 10/438,147.

Office action dated Jun. 22, 2006 from U.S. Appl. No. 10/438,147.

Office action dated Nov. 10, 2004 from U.S. Appl. No. 10/802,500.

Office action dated Apr. 12, 2005 from U.S. Appl. No. 10/802,500.

Office action dated May 2, 2006 from U.S. Appl. No. 10/802,500.

Office action dated Nov. 24, 2006 from U.S. Appl. No. 10/802,500.

Office action dated Sep. 19, 2007 from U.S. Appl. No. 11/210,405.

Office action dated Feb. 26, 2008 from U.S. Appl. No. 11/210,405.

Office action dated Aug. 29, 2006 from U.S. Appl. No. 11/372,998.

Office action dated Jun. 20, 2007 from U.S. Appl. No. 11/372,998.

Li et al., *Advances in Biodegredation and Biotransformation of Lignocellulosics*, The 225$^{th}$ ACS National Meeting, New Orleans, LA, Mar. 24, 2003.

Li et al., *Composites from Renewable Resources*, The 225$^{th}$ ACS National Meeting, New Orleans, LA, Mar. 26, 2003.

Liu et al., *Macromol. Rapid Commun.* 23(13):739-742, 2002.

Yu et al., *Macromolecules* 31:4739-4745, 1998.

Yu et al., *J. Am. Chem. Soc.* 121:5825-5826, 1999.

DuPont Protein Technologies, Soy Protein Forms, http://www.proteintechnologies.com/corp_eng.nsh/pages/Soy-3, 2002.

Georgia-Pacific Chemical Products, Wet and Dry Strength Resins, http://www.gp.com/chemical/products.asp, 2002.

Hercules Incorporated, Material Safety Data Sheet, http://msds.plaza.herc.com/msds/00223300.html.

Hercules Incorporated, Kymene 557H Wet-Strength Resin Product Data Sheet, 1999.

PCT/US2004/012307 International Search Report dated Dec. 29, 2004.

\* cited by examiner

SF-K736 adhesive formulation: the total solids content, 35%; SF:K736 weight ratio, 10:1; A: SF only; B: SF + K736; C: SF + K736 + NaOH (NaOH, 1 wt%); D: SF + K736 + $Na_2B_4O_7$ ($Na_2B_4O_7$, 1 wt%); E: SF + K736 + NaOH (NaOH, 2 wt%); F: SF + K736 + $Na_2B_4O_7$ ($Na_2B_4O_7$, 2 wt%). The weight precentages of NaOH and $Na_2B_4O_7$ were based on the total solids content.

SF-K736 adhesive formulation: the total solids content, 50%; SF:K736 weight ratio, 10:1; A: SF only; B: SF + K736; C: SF + K736 + NaOH (NaOH, 1 wt%); D: SF + K736 + $Na_2B_4O_7$ ($Na_2B_4O_7$, 0.69 wt%); The weight precentages of NaOH and $Na_2B_4O_7$ were based on the total solids content.

FORMALDEHYDE-FREE ADHESIVES AND LIGNOCELLULOSIC COMPOSITES MADE FROM THE ADHESIVES

CROSS REFERENCE TO RELATED APPLICATION

This is a §371 U.S. National Stage of International Application No. PCT/US2005/001981, filed Jan. 19, 2005, which was published in English under PCT Article 2/1(2), which claims the benefit of U.S. Provisional Patent Application No. 60/538,932 filed Jan. 22, 2004, both of which are incorporated herein by reference.

FIELD

The present disclosure relates to adhesives for making lignocellulosic composites.

BACKGROUND

Lignocellulosic-based composites are formed from small dimension pieces of cellulosic material that are bonded with an adhesive (i.e., a binder). In general, solid wood is fragmented into smaller pieces such as strands, fibers, and chips. An adhesive composition then is added to the wood component. The resulting mixture is subjected to heat and pressure resulting in a composite. The adhesive mix typically is the only non-lignocellulosic component.

The most commonly used wood adhesives are phenol-formaldehyde resins (PF) and urea-formaldehyde resins (UF). There are at least two concerns with PF and UF resins. First, volatile organic compounds (VOC) are generated during the manufacture and use of lignocellulosic-based composites. An increasing concern about the effect of emissive VOC, especially formaldehyde, on human health has prompted a need for more environmentally acceptable adhesives. Second, PF and UF resins are made from petroleum-derived products. The reserves of petroleum are naturally limited. The wood composite industry would greatly benefit from the development of formaldehyde-free adhesives made from renewable natural resources.

Soy protein was used as a wood adhesive for the production of plywood from the 1930's to the 1960's. Petroleum-derived adhesives replaced soy protein adhesives due to the relatively low bonding strength and water resistance of soy protein adhesives. However, soy protein is an inexpensive, abundant, renewable material that is environmentally acceptable.

SUMMARY OF THE DISCLOSURE

Disclosed herein are adhesive compositions and methods for making lignocellulosic composites.

A first variant of the adhesive compositions includes soy protein and/or lignin; at least one substantially formaldehyde-free curing agent that includes at least one amine, amide, imine, imide, or nitrogen-containing heterocyclic functional group that can react with at least one functional group of the soy protein; and at least one compound selected from a boron compound, a group IA oxide or hydroxide, or a group IIA oxide or hydroxide.

A second variant of the adhesive composition includes a first component selected from soy protein and/or lignin; and at least one substantially formaldehyde-free curing agent selected from a reaction product of epichlorohydrin with ethylenediamine, a reaction product of epichlorohydrin with bis-hexamethylenetriamine, or a reaction product of epichlorohydrin with hexamethylenediamine.

Also disclosed herein are methods for making a lignocellulosic composite that include applying the first variant or the second variant of the adhesive composition described above to at least one lignocellulosic substrate, and bonding the adhesive-applied lignocellulosic substrate to at least one other lignocellulosic substrate. Lignocellulosic composites made according to these methods are also described herein.

BRIEF DESCRIPTION OF THE FIGURES

Certain embodiments will be described in more detail with reference to the following figures.

DETAILED DESCRIPTION OF SEVERAL EMBODIMENTS

Figure 1:
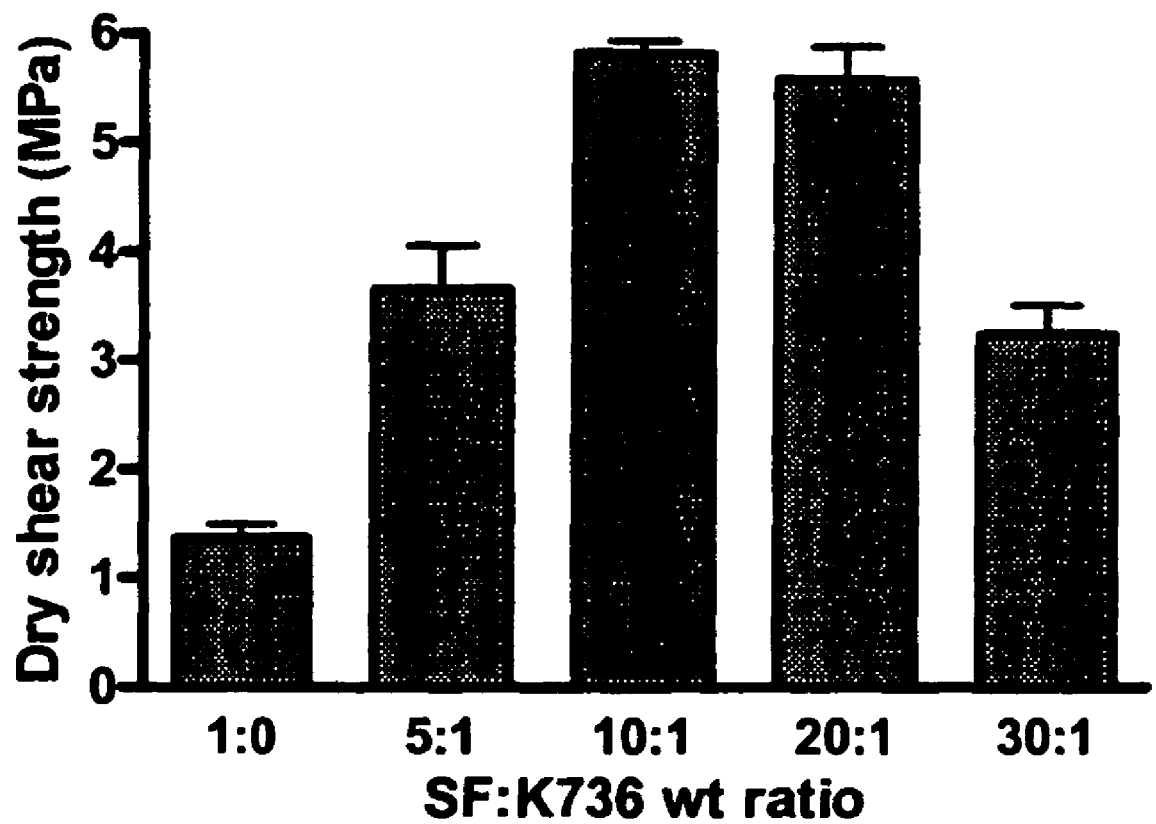
FIG. 1 is a graph depicting the dry shear strength of several examples of adhesive compositions disclosed herein.

For ease of understanding, the following term used herein is described below in more detail:

"Lignin" generally refers to a group of phenolic polymers that confer strength and rigidity to plant material. Lignins are very complex polymers with many random couplings, and thus tend to be referred to in more generic terms. Lignins may include, for instance, analytical lignin preparations such as Brauns lignin, cellulolytic enzyme lignin, dioxane acidolysis lignin, milled wood lignin, Klason lignin, and periodate lignin, and industrial lignin preparations such as kraft lignin and lignosulfonates.

The above term description is provided solely to aid the reader, and should not be construed to have a scope less than that understood by a person of ordinary skill in the art or as limiting the scope of the appended claims.

The adhesive composition can be made by reacting or mixing a soy protein and/or a lignin with at least one substantially formaldehyde-free curing agent. A mixture of soy protein and lignin may be employed. The substantially formaldehyde-free compound may provide both curing for the adhesive composition and adhesion to the lignocellulosic substrate. In other words, the substantially formaldehyde-free compound is a difunctional adhesion promoter in the sense that one compound can provide dual functions. In the first variant described above, the adhesive also includes at least one boron compound, a group IA oxide or hydroxide, or a group IIA oxide or hydroxide. In the second variant described above, the curing agent is specifically a reaction product of epichlorohydrin with ethylenediamine, a reaction product of epichlorohydrin with bis-hexamethylenetriamine, a reaction product of epichlorohydrin with hexamethylenediamine, or a mixture thereof. Both the first and second variants of the adhesive composition may be provided as a two-part system in which the protein or lignin comprises one part or package and the curing agent comprises the second part or package. In both the first and second variants, all the parts or components of the composition may be in the form of aqueous solutions or dispersions. Thus, volatile organic solvents as carrier fluids can be avoided. These two variants are described in more detail below.

Soy protein is an exemplary protein for use in the presently described adhesives. Soybeans contain about 38 weight percent protein with the remaining portion comprising carbohydrates, oils and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. Soy flour typically includes approximately 50 weight percent protein, soy protein concentrate includes at least about 65 weight percent protein (dry weight), and SPI includes at least about 85 weight percent protein (dry weight). According to certain embodiments of the adhesive composition, the soy protein is SPI or soy flour.

As mentioned above, the lignin may comprise an industrial lignin preparation such as kraft lignin. Currently kraft lignin has limited commercial utility, however tons of waste kraft lignin are produced each year as a byproduct of commercial paper production. In particular, kraft lignin typically is produced from woody material in reaction with NaOH and $Na_2S$.

The soy protein or lignin may be prepared for use in the adhesive compositions in any manner. Typically, the soy protein or lignin is included in a carrier or delivery liquid such as water or similar solvent. In particular, the soy protein or lignin may be dissolved in water and the resulting aqueous solution mixed with the curing agent and/or boron compound. The aqueous adhesive solution may be prepared, for example, by initially mixing the soy protein or lignin in water and adjusting the pH of the mixture to the desired range. When the soy protein or lignin is mixed with a difunctional curing agent, the pH of the soy protein or lignin part may be sufficiently alkaline so that the resulting protein/difunctional curing agent mixture is non-acidic or, more particularly, alkaline. For example, the pH of the soy protein or lignin part may be about 7 to about 14 resulting in a pH of greater than 6 and up to about 11 for the combined two-part mixture. The pH may be adjusted by adding basic substances such as, for example, alkali metal hydroxides, ammonium hydroxide, amines or pyridine. The amount of soy protein or lignin dissolved in the water may be adjusted to provide the desired solids content for the soy protein or lignin part of the two part system. The soy protein or lignin solids content may be, for example, from about 10 to about 70 weight percent. The soy protein or lignin solution may be freeze-dried at this stage of formulation or it may remain as a liquid solution. If the soy protein or lignin solution is freeze-dried, water (or the appropriate carrier fluid) is simply added to the freeze-dried substance prior to use. Freeze-drying reduces the costs of transporting the adhesive. The curing agent and/or boron compound may be mixed with the aqueous soy protein or lignin solution to form the final adhesive composition that is applied to the lignocellulosic substrate.

Although not bound by any theory, as mentioned above, it is believed that the molecular structure of the difunctional curing agent includes (1) a reactive site that can cure the adhesive composition and (2) a reactive site that provides adhesion to the lignocellulosic substrate. The cure reactive site and the adhesion reactive site may be located at the same site on the difunctional curing agent. In other words, a first portion of the available reactive sites on a difunctional curing agent molecule may react with other difunctional curing agent molecules or react with the functional groups (especially carboxylic acid and amino) of the protein. A second portion of the available reactive sites on a difunctional curing agent molecule may form covalent and/or hydrogen bonds with the lignocellulosic substrate.

Examples of suitable difunctional curing agents include reaction products of epoxides with polyamine resins, polyamidoamines resins, or polyamide resins. Such resins typically are made from glycidylether or epichlorohydrin condensates of polyalkylene polyamines and are used as wet-strength agents for paper. The resins may be water-soluble or water-dispersible. These resins typically include a nitrogen-containing heterocyclic functional group that is the reactive site for covalently bonding to protein functional groups, covalently bonding to nitrogen-containing heterocyclic functional groups of other resin molecules, and covalently bonding to carboxylic acid and/or hydroxyl groups in the lignocellulosic substrate.

Illustrative commercially-available reaction products of epoxides with polyamine resins, polyamidoamines resins, or polyamide resins include Kymene® resins available from Hercules Inc. and Amres® resins available from Georgia-Pacific Corporation. Kymene® 557H resins are one specific example that is based on the reaction product of poly(adipic acid-co-diethylenetriamine) and epichlorohydrin. Kymene® 557H resins are believed to have a structure that includes a nitrogen-containing, 4-member ring, functional group as shown below:

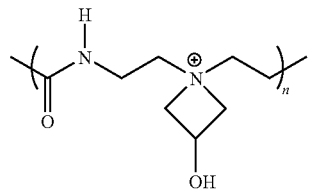

An excess of epichlorohydrin is used to control the rate of crosslinking during the manufacturing process and to aid in storage stability. Such compositions and processes for their manufacture are disclosed, for example, in U.S. Pat. Nos. 2,926,116 and 2,926,154. A further illustrative class of polyamine-epichlorohydrin resins are those produced by the reaction of an epihalohyrin, such as epichlorohydrin, with a polyalkylene polyamine, such as ethylenediamine, bis-hexamethylenetriamine and hexamethylenediamine. These polyalkylene polyamine-epihalohydrin resins are described, for example, in U.S. Published Patent Application 20030070783, U.S. Pat. Nos. 3,655,506, 3,248,353 and 2,595,935. Kymene® 736 resin is a commercially-available example of such a polyalkylene polyamine-epichlorohydrin resin.

As mentioned above, at least one boron compound, a group IA oxide or hydroxide, or a group IIA oxide or hydroxide may be included in the adhesive composition. The boron compound may be any compound or material that includes at least one boron atom or species. "Group IA" and "group IIA" refer to the element classifications in the Periodic Table of the Elements. Although not bound by any theory, it is believed that a boron species can potentially chelate with four hydroxyl groups, thus serving as a crosslinking agent for the soy protein or lignin. The group IA or group IIA species can potentially chelate with a plurality of carboxylic acid groups, thus serving as a crosslinking agent for the soy protein or lignin.

In particular examples the boron compound may be boric acid, a boron salt, or a borate ester. As is understood by those of ordinary skill in the art, boric acid, borate salts and borate esters can be produced from numerous other boron compounds, including without limitation, metaborates, acyl borates, anhydrous borates, borax, boron hydrides, and the like. Specific examples of borate salts or borate esters include sodium borate, anhydrous sodium borate, sodium tetraborate, sodium boroformate and sodium borohydride. Similarly, a person of ordinary skill in the art will recognize that boron compounds can be provided as various salts and in various hydration states, including without limitation, $KB_5 \cdot H_2O$, $Na_2B_4O_7 \cdot 10H_2O$, $Na_2B_4O_7 \cdot 5H_2O$, $Mg_3B_7O_{13}Cl$, $K_3B_3O_6$, $CaB_2O_4$, and the like.

In particular examples the group IA oxide or hydroxide or group IIA oxide or hydroxide may be a hydroxide or oxide of calcium, sodium or potassium. Illustrative compounds include sodium hydroxide, potassium hydroxide, calcium hydroxide, or calcium oxide.

The relative amount of soy protein or lignin mixed with the curing agent may range depending, for example, upon the number of available reactive sites and the molecular weight of the curing agent. For example, the mix ratio of soy protein or lignin to curing agent may range from about 1:1 to about 1000:1, more particularly from about 1:1 to about 100:1, based on dry weight. In one particular embodiment, the mix ratio of soy protein to curing agent is about 2:1 to about 30:1, based on dry weight. Viewed another way, the adhesive composition may include about 0.1 to about 50, more particularly about 0.5 to about 10, wt % curing agent, based on the combined dry weight of the soy protein and the curing agent.

The amount of boron compound, group IA oxide or hydroxide, or group IIA oxide or hydroxide added to the mixture may also vary. For example, about 0.1 to about 20, more particularly about 0.5 to about 10, wt % of the compound(s) may be included in the adhesive, based on the combined dry weight of soy protein, compound, and curing agent.

The adhesive composition may also include additives and fillers found in lignocellulosic adhesives such as bactericides, insecticides, silica, wax, wheat flour, tree bark flour, nut shell flour and the like.

The ingredients of the adhesive composition may be mixed together in any order and at standard temperature and pressure (i.e., about 25° C. and about 1 atmosphere). Typically, the ingredients are water soluble or water dispersible. The solids content of the resulting final adhesive mixture may be from about 15 to about 70, more particularly from about 20 to about 68, wt. %. Each (or only one) part of the adhesive system could be provided to the end user in the form of a concentrate that is diluted by the end user to the appropriate mix ratios and solid contents.

According to one approach, the adhesive composition can be utilized as a two-part system in which the soy protein or lignin component comprises one part and the curing agent comprises the second part. The two parts are mixed together a short time prior to use. The composition may have an open time of up to about 5 days. As used herein, "open time" denotes the time from mixing of the two parts to the time at which the mixed composition cures to a point that it is no longer workable. In another approach, all the ingredients of the adhesive composition are pre-mixed together in a one-part system that is then supplied to an end user. In the one-part system the adhesive composition can be applied to a substrate without the need for mixing together two different components.

The adhesive compositions are heat-curable. In other words, heating the two part adhesive mixture forms covalent bonds between the individual molecules of the adhesive composition and covalent and/or hydrogen bonds between molecules of the adhesive mixture and the lignocellulosic particles. Such curing typically occurs during the hot pressing step of the composite formation. Thus, the cure temperature of the adhesive composition is tailored so that it coincides with the heating temperatures used in composite formation. Such cure temperatures may range, for example, from about 90 to about 200° C., more particularly from about 100 to about 160° C.

Lignocellulosic composites that can be produced with the adhesives described herein include particleboard, plywood, oriented strand board (OSB), waferboard, fiberboard (including medium-density and high-density fiberboard), parallel strand lumber (PSL), laminated strand lumber (LSL), laminated veneer lumber (LVL), and similar products. In general, these composites are made by first blending comminuted lignocellulosic materials with an adhesive that serves as a binder that adheres the comminuted lignocellulosic materials into a unitary densified mass. Examples of suitable lignocellulosic materials include wood, straw (including rice, wheat and barley), flax, hemp and bagasse. The comminuted lignocellulosic materials can be processed into any suitable substrate form and size such as chips, flakes, fibers, strands, wafers, trim, shavings, sawdust, straw, stalks, shives, and mixtures thereof.

The lignocellulosic materials are mixed together with the adhesive composition serving as a binder, and formed into a desired configuration to provide a pre-bonded assembly. The pre-bonded assembly then is subjected to heat and elevated pressure to provide the lignocellulosic composite product. For example, the pre-bonded assembly may be subjected to temperatures of from about 120 to 225° C. in the presence of varying amounts of steam, generated by liberation of entrained moisture from the lignocellulosic materials.

The amount of adhesive mixed with the lignocellulosic particles may vary depending, for example, upon the desired composite type, lignocellulosic material type and amount and specific adhesive composition. In general, about 1 to about 12, more particularly about 3 to about 10, weight percent adhesive may be mixed with the lignocellulosic material, based on the total combined weight of adhesive and lignocellulosic material. The mixed adhesive composition may be added to the comminuted lignocellulosic particles by spraying or similar techniques while the lignocellulosic particles are tumbled or agitated in a blender or similar mixer. For example, a stream of the comminuted lignocellulosic particles may be intermixed with a stream of the mixed adhesive composition and then be subjected to mechanical agitation.

The adhesive compositions also may be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesives provide a strong bond between the lignocellulosic substrates. The adhesives also provide structural composites with surprisingly high mechanical strength. In addition, the adhesive compositions are substantially free of formaldehyde (including any compounds that may degenerate to form formaldehyde). For example, the adhesive compositions do not contain any formaldehyde (and formaldehyde-generating compounds) that is detectable by conventional methods or, alternatively, the amount of formaldehyde (and formaldehyde-generating compounds) is negligible from an environmental and workplace regulatory standpoint.

The specific examples described below are for illustrative purposes and should not be considered as limiting the scope of the appended claims.

EXAMPLE 1

Preparation of Adhesive Mixture

Method 1

Soy flour (SF) (30 g dry weight) was slowly added to 170 ml water in a 600 ml flask with stirring. The pH value of the soy flour slurry was adjusted to about 10 with 50 wt % NaOH solution. The SF mixture was stirred for 20 min and used as a control for bonding maple veneers as described below. A 38 wt % Kymene 736 ("K736", from Hercules, Inc., Wilmington, Del.) aqueous solution (15.8 g) was added to the alkaline SF mixture. The resulting SF-K736 aqueous mixture was stirred for another 30 min and then used as an adhesive for maple veneers as described below in Example 3. The total solids content of the SF-K736 adhesive was 16.7% and the SF:K736 weight ratio was 5:1. The SF-K736 adhesives with different SF:K736 weight ratios were prepared by adjusting the amount of K736 and water.

EXAMPLE 2

Preparation of Adhesive Mixture

Method 2

A 38 wt % K736 aqueous solution (12.6 g) was added to 45 ml water with stirring. The soy flour (48 g dry weight) was slowly added to the K736 solution with vigorous stirring. The resulting SF paste was used as a control for bonding maple veneers as describe below in Example 3. Additional examples of adhesives were made by dissolving the 38 wt % K736 solution (12.6 g) and 0.53 g NaOH or 0.77 g $Na_2B_4O_7 \cdot 5H_2O$ in 45.3 ml water. The SF (48 g dry weight) was slowly added to the K736-NaOH solution or the $K736-Na_2B_4O_7$ solution with a vigorous stirring. The resulting SF-K736 adhesives had 50 wt % total solids content and contained 1 wt % NaOH or 1 wt % $Na_2B_4O_7$ based on the total solids content. The SF:K736 weight ratio was 10:1. The resulting SF:K736 adhesives were used to bond maple veneers as described below in Example 3.

EXAMPLE 3

Preparation and Testing Wood Composites

The SF-K736 adhesive mixtures prepared as described in Examples 1 and 2 were evaluated for their ability to bond together two pieces of maple veneer. The adhesive preparation for testing was applied to one side and the end of a maple veneer strip (1 cm×10 cm). Two pieces of maple veneer strips were stacked together and hot-pressed at 120° C. for 5 minutes. The applied pressure was 11 kg/cm². The bonding area for each two-ply composite specimen was 2.0 cm². The total spread rate of the adhesives was 9 mg/cm² bonding area. The lap-shear strength was measured with an Instron TTBML machine with a crosshead speed of 1.0 mm/min using conventional techniques. The maximum shear strength at breakage was recorded.

The two-ply wood composite specimens bonded with the adhesives were subjected to a water-soaking-and-drying (WSAD) test and a boiling-water test (BWT). For a WSAD test, the specimens were soaked in water at room temperature for 24 hours, dried in a fume hood at room temperature for 24 hours, and then evaluated for the shear strength. A BWT was performed according to the U.S. Voluntary Product Standard PS 1-95 for Construction and Industrial Plywood (published by the U.S. Department of Commerce through The Engineered Wood Association, Tacoma, Wash.). The specimens were boiled in water for 4 hours, dried for 24 hours at 63±3° C., boiled in water again for 4 hours, and then cooled down with tap water. The shear strength of several specimens was evaluated when they were wet. The shear strength determined in this fashion was referred to as BWT/wet strength. Shear strength was also measured after several specimens had been dried at room temperature in a fume hood for 24 hours. This strength was referred to as BWT/dry strength.

The effect of SF:K736 weight ratio on the lap-shear strength of dry wood composites bonded with SF-K736 adhesives is shown in FIG. 1. The data shown in FIG. 1 are the results with adhesives made according to Example 1 above. At all weight ratios, a mixture of SF and K736 provided greater lap-shear strength compared to SF alone. The shear strength significantly increased with increasing the SF:K736 weight ratio from 5:1 to 10:1. When the SF:K736 weight ratio increased from 10:1 to 20:1, the shear strength slightly decreased. However, further increase in the weight ratio resulted in significant loss of the shear strength.

Figure 2:
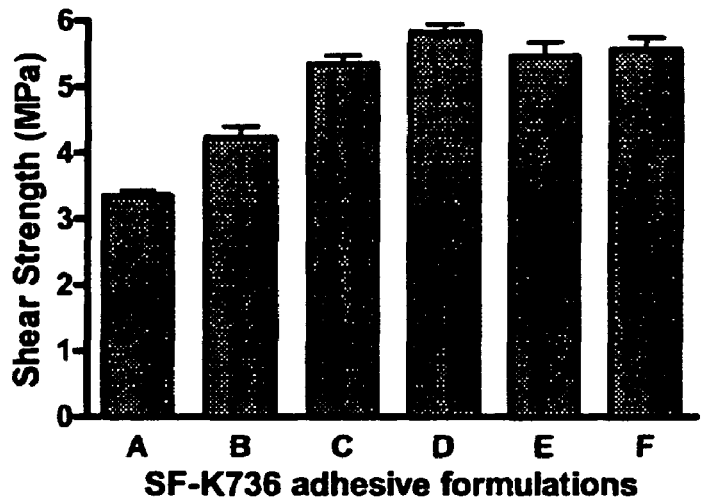
FIG. 2 is a graph depicting the shear strength of several other examples of adhesive compositions disclosed herein.

Compared with an aqueous SF suspension (composition A) at 35% total solids content, a SF-K736 mixture (composition B) resulted in higher shear strength (see FIG. 2). Addition of 1 wt % NaOH to the SF-K736 mixture (composition C) gave rise to an improved shear strength compared to the SF-K736 adhesive. The replacement of NaOH with $Na_2B_4O_7$ (composition D) further increased the shear strength. At 2 wt %, NaOH (composition E) and $Na_2B_4O_7$ (composition F) had the same effect on the enhancement of shear strength and had slightly lower strength than $Na_2B_4O_7$ at 1 wt % (see FIG. 2).

Figure 3:
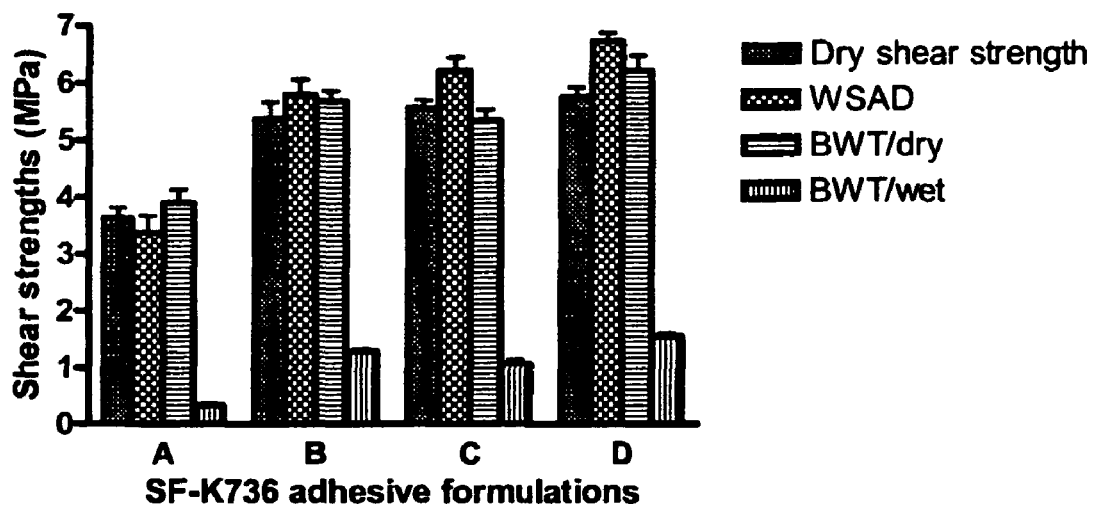
FIG. 3 is a graph depicting the shear strength of several further examples of adhesive compositions disclosed herein.

At the 50% total solids content, the SF-K736 adhesives were sticky, but could be readily applied to veneers. The data shown in FIG. 3 further confirmed conclusions drawn from FIGS. 1 and 2: SF-K736 adhesives could result in much higher dry shear strength than SF alone; addition of NaOH (composition C) or $Na_2B_4O_7$ (composition D) further increased the shear strength; and $Na_2B_4O_7$ at 0.67 wt % gave higher shear strengths than NaOH at 1 wt %. Moreover, wood composites bonded with SF-K736 adhesives were much more water resistant than SF alone. When the wood composites bonded with SF alone or SF-K736 adhesives underwent a boiling water test (BWT), some delamination occurred for the wood composites bonded with SF alone, but no delamination was observed for those bonded with SF-K736 adhesives. The SF-K736-NaOH adhesives provided slightly lower BWT/dry and BWT/wet shear strengths compared to the SF-K736 adhesives and $SF-K736-Na_2B_4O_7$ adhesives. $SF-K736-Na_2B_4O_7$ adhesives resulted in the highest shear strengths (dry, WSAD, BWT/dry and BWT/wet) among all adhesive formulations. In other words, $Na_2B_4O_7$ greatly enhanced the shear strength and water resistance of the resulting wood composites.

EXAMPLE 4

Preparation of Kraft Lignin

K736 Adhesive

The 38 wt % K736 solution (10.5 g) was added to 17.5 ml water with stirring. Kraft lignin (20 g dry weight) was slowly added to the diluted K736 solution with vigorous stirring. The resulting kraft lignin-K736 adhesive had 50 wt % total solids content and was used for bonding maple veneers. The adhesives were applied to one side and the end of a maple veneer strip (1 cm×10 cm). Two pieces of maple veneer strips were stacked together and hot-pressed at 150° C. for 5 minutes. The applied pressure was 11 kg/cm². The bonding area for each two-ply composite specimen was 2.0 cm². The total spread rate of the adhesives was 9 mg/cm² bonding area.

Having illustrated and described the principles of the disclosed methods, compositions and composites with reference to several embodiments, it should be apparent that these methods, compositions and composites may be modified in arrangement and detail without departing from such principles.

What is claimed is:

1. An adhesive composition, comprising:
    soy protein or a mixture of soy protein and lignin;
    at least one substantially formaldehyde-free curing agent that includes at least one amine, amide, imine, imide, or nitrogen-containing heterocyclic functional group that can react with at least one functional group of the soy protein; and
    at least one boron compound.

2. The composition according to claim 1 wherein the composition is substantially formaldehyde-free.

3. The composition according to claim 1 wherein the composition includes about 0.5 wt. % to about 10 wt. % of the at least one boron compound, based on the dry weight of the composition.

4. The composition according to claim 3 wherein the composition includes about 2 wt. % to about 30 wt. % of the at least one curing agent, based on the dry weight of the composition.

5. The composition of claim 1 wherein the boron compound is selected from boric acid, a boron salt, or a borate ester.

6. The composition of claim 1 wherein the boron compound comprises sodium borate, sodium borohydride or sodium tetraborate.

7. The composition of claim 6 wherein the soy protein comprises soy flour and the curing agent comprises a reaction product of epichlorohydrin with ethylenediamine, bis-hexamethylenetriamine or hexamethylenediamine.

8. The composition of claim 1 wherein the curing agent is a reaction product of an epoxide with a polyamine resin, a reaction product of an epoxide with a polyamidoamine resin, or reaction product of epoxide with a polyamide resin.

9. The composition of claim 1 wherein the curing agent comprises a polyalkylene polyamine-epihalohydrin resin.

10. The composition of claim 9 wherein the curing agent comprises a reaction product of epichlorohydrin with ethylenediamine, bis-hexamethylenetriamine or hexamethylenediamine.

11. The composition according to claim 1, wherein the composition comprises a reaction product of the soy protein, the at least one curing agent, and the at least one boron compound.

12. A method for making an adhesive composition comprising mixing together:
    soy protein or a mixture of soy protein and lignin;
    at least one substantially formaldehyde-free curing agent that includes at least one amine, amide, imine, imide, or nitrogen-containing heterocyclic functional group; and
    at least one boron compound.

13. A method for making an adhesive composition comprising:
    mixing together at least one a boron compound, with at least one substantially formaldehyde-free curing agent that includes at least one amine, amide, imine, imide, or nitrogen-containing heterocyclic functional group; and
    contacting the resulting product with soy protein or a mixture of soy protein and lignin.

14. The method of claim 13, wherein the at least one boron compound/curing agent product is contacted with the soy protein or mixture of soy protein and lignin under conditions sufficient for reacting the boron compound/curing agent product with the soy protein.

15. The method of claim 13, wherein the soy protein comprises soy flour, the at least one curing agent comprises a reaction product of epichlorohydrin with ethylenediamine, bis-hexamethylenetriamine or hexamethylenediamine, and the at least one boron compound is selected from boric acid, a boron salt, or a borate ester, 16. An adhesive composition made according to claim 15.

17. An adhesive composition produced from the following ingredients:
    soy protein or a mixture of soy protein and lignin;
    at least one substantially formaldehyde-free curing agent that includes at least one amine, amide, imine, imide, or nitrogen-containing heterocyclic functional group; and
    at least one boron compound.

18. An adhesive composition, comprising a reaction product of:
    a first component selected from at least one of soy protein, lignin, or a mixture thereof; and
    at least one substantially formaldehyde-free curing agent comprising a polyalkylene polyamine-epichlorohydrin resin selected from (i) a reaction product of epichlorohydrin with ethylenediamine, (ii) a reaction product of epichlorohydrin with bis-hexamethylenetriamine, or (iii) a reaction product of epichlorohydrin with hexamethylenediamine.

19. The composition according to claim 18 wherein the composition is substantially formaldehyde-free.

20. The composition according to claim 18 wherein the composition includes about 2 wt. % to about 30 wt. % the curing agent, based on the dry weight of the composition.

21. The composition according to claim 18, wherein the first component is soy protein.

22. The composition according to claim 21, wherein the soy protein comprises soy flour.

23. The composition according to claim 18, wherein the composition comprises a reaction product of the first component and the at least one curing agent.

24. The composition according to claim 18, wherein the first component is lignin.

25. A method for making an adhesive composition comprising mixing together:
    a first ingredient selected from soy protein, lignin, or a mixture thereof; and
    at least one substantially formaldehyde-free curing agent comprising a polyalkylene polyamine-epichlorohydrin resin selected from (i) a reaction product of epichlorohydrin with ethylenediamine, (ii) a reaction product of epichlorohydrin with bis-hexamethylenetriamine, (iii) or a reaction product of epichlorohydrin with hexamethylenediamine.

26. An adhesive composition made according to claim 25.

27. A method for making a lignocellulosic composite, comprising:
    applying an adhesive composition to at least one lignocellulosic substrate, the adhesive composition comprising (i) soy protein, (ii) at least one substantially formaldehyde-free curing agent that includes at least one amine, amide, imine, imide, or nitrogen-containing heterocyclic functional group that can react with at least one functional group of the soy protein, and (iii) at least one boron compound; and bonding the adhesive-applied lignocellulosic substrate to at least one other lignocellulosic substrate.

28. The method of claim 27, wherein the bonding comprises applying heat and pressure to an assembly of the adhesive-applied lignocellulosic substrate and the other lignocellulosic substrate.

29. The method of claim 27, wherein the lignocellulosic substrates comprises comminuted wood particles and the method comprises:

blending about 1 to about 12 weight percent of the adhesive composition with a mixture of the comminuted wood particles, the weight percent being based on the combined weight of the adhesive composition and the comminuted wood particles;

forming the adhesive/wood particle blend into a predetermined configuration; and applying heat and pressure to the formed blend.

30. The method of claim 27, wherein the lignocellulosic substrates comprises a wood veneer substrate and the method comprises:

applying the adhesive composition to at least one surface of the wood veneer substrate;

forming an assembly of the adhesive-applied wood veneer substrates; and applying heat and pressure to the assembly.

31. The method of claim 27, wherein the at least one boron compound is selected from boric acid, a boron salt, or, and the curing agent comprises a resin that is (i) a reaction product of epichlorohydrin with ethylenediamine, (ii) a reaction product of epichlorohydrin with bis-hexamethylenetriamine or (iii) a reaction product of epichlorohydrin with hexamethylenediamine.

32. A lignocellulosic composite made according to the method of claim 27.

33. A method for making a lignocellulosic composite, comprising:

applying an adhesive composition to at least one lignocellulosic substrate, the adhesive composition comprising (i) a first component selected from soy protein, lignin, or a mixture thereof and (ii) at least one substantially formaldehyde-free curing agent comprising a polyalkylene polyamine-epichlorohydrin resin selected from (i) a reaction product of epichlorohydrin with ethylenediamine, (ii) a reaction product of epichlorohydrin with bis-hexamethylenetriamine, or (iii) a reaction product of epichlorohydrin with hexamethylenediamine; and bonding the adhesive-applied lignocellulosic substrate to at least one other lignocellulosic substrate.

34. The method of claim 33, wherein the bonding comprises applying heat and pressure to an assembly of the adhesive-applied lignocellulosic substrate and the other lignocellulosic substrate.

35. The method of claim 33, wherein the lignocellulosic substrates comprises comminuted wood particles and the method comprises:

blending about 1 to about 12 weight percent of the adhesive composition with a mixture of the comminuted wood particles, the weight percent being based on the combined weight of the adhesive composition and the comminuted wood particles;

forming the adhesive/wood particle blend into a predetermined configuration; and applying heat and pressure to the formed blend.

36. The method of claim 33, wherein the lignocellulosic substrates comprises a wood veneer substrate and the method comprises:

applying the adhesive composition to at least one surface of the wood veneer substrate;

forming an assembly of the adhesive-applied wood veneer substrates; and applying heat and pressure to the assembly.

37. The method of claim 33, wherein the first component is soy protein.

38. The method of claim 33, wherein the first component is lignin.

39. A lignocellulosic composite made according to the method of claim 33.

* * * * *